United States Patent
Kawakami et al.

(10) Patent No.: US 10,935,144 B2
(45) Date of Patent: Mar. 2, 2021

(54) SUPPLYING APPARATUS OF GRANULAR MATERIAL

(71) Applicant: KABUSHIKIKAISHA MATSUI SEISAKUSHO, Osaka (JP)

(72) Inventors: Hajime Kawakami, Osaka (JP); Yuya Yoneda, Osaka (JP)

(73) Assignee: KABUSHIKIKAISHA MATSUI SEISAKUSHO, Osaka (JP)

( * ) Notice: Subject to any disclaimer, the term of this patent is extended or adjusted under 35 U.S.C. 154(b) by 0 days.

(21) Appl. No.: 16/654,248

(22) Filed: Oct. 16, 2019

(65) Prior Publication Data
US 2020/0124188 A1  Apr. 23, 2020

(30) Foreign Application Priority Data

Oct. 22, 2018 (JP) .............................. JP2018-198125

(51) Int. Cl.
*F16K 3/26* (2006.01)
*B65D 83/06* (2006.01)

(52) U.S. Cl.
CPC .............. *F16K 3/262* (2013.01); *B65D 83/06* (2013.01)

(58) Field of Classification Search
CPC .......... G97F 13/02; F16K 3/262; F16K 3/267; F16K 25/005; B65D 83/06; B01F 15/026; B01F 15/00149; B01F 15/0226; B01F 15/0458; B01F 15/0227; B01F 7/02
USPC ...... 222/59, 559, 77, 20, 49, 50, 57, 58, 71, 222/72, 344, 353, 402.25, 253, 217, 229, 222/240, 510, 514, 305, 453, 476
See application file for complete search history.

(56) References Cited

U.S. PATENT DOCUMENTS

| | | | | |
|---|---|---|---|---|
| 1,149,522 A | * | 8/1915 | Sucked ................... | G01F 11/18 222/361 |
| 5,138,979 A | * | 8/1992 | Baird ...................... | A01K 61/80 119/51.04 |
| 6,467,943 B1 | | 10/2002 | Maguire | |
| 8,141,751 B2 | * | 3/2012 | Luechinger ........... | B65B 39/004 222/235 |
| 8,176,947 B2 | * | 5/2012 | Frei ......................... | G01G 13/00 141/1 |
| 2009/0293986 A1 | * | 12/2009 | Blochlinger ........... | G01G 17/06 141/1 |
| 2011/0172934 A1 | * | 7/2011 | Frei ......................... | G01G 11/08 702/45 |

* cited by examiner

*Primary Examiner* — Lien M Ngo
(74) *Attorney, Agent, or Firm* — Muncy, Geissler, Olds & Lowe, P.C.

(57) ABSTRACT

A supplying apparatus of granular material including a storage container storing granular material and a supplying portion having a columnar valve body sliding along an opening direction of a guide hole provided for the storage container. The supplying portion supplies granular material to a supply destination; the valve body includes a material supplying passage penetrating the valve body so as to provide an inlet and an outlet on a side circumferential face and includes a closing portion closing the guide hole when the valve body is at a closed position, the closing portion being provided in the guide hole; and the material supplying passage slants in such a manner that the inlet opens in the storage container and the outlet opens outside the storage container when the valve body is at a supply position supplying granular material.

6 Claims, 6 Drawing Sheets

SUPPLYING APPARATUS OF GRANULAR MATERIAL

BACKGROUND OF THE INVENTION

Field of the Invention

The present invention relates to a supplying apparatus of granular material for supplying granular material to a supply destination.

Description of the Related Art

Conventionally known is a supplying apparatus in which a storage container storing granular material is provided with a supplying portion supplying granular material to a supply destination.

For example, Patent Literature 1 to be mentioned below discloses a blender in which a tubular valve member and a skirt housing the tubular valve member are provided in a hopper. The blender is configured in such a manner that granular material is discharged from an opening at a lower end of the tubular valve member when a notch in the skirt communicates with a notch provided the tubular valve member so as to open on the side circumferential face; on the other hand, the tubular valve member is closed when the tubular valve member is moved into the skirt so as not to communicate the notch on the side circumferential face with the notch in the skirt.

CITATION LIST

Patent Literature

PTL 1: U.S. Pat. No. 6,467,943

SUMMARY OF THE INVENTION

Problems to be Solved by the Invention

In the blender disclosed in Patent Literature 1, the skirt housing the tubular valve member is required to be provided in the hopper and further improvement is desired. In addition, because the opening at the lower end of the tubular valve member opens toward outside in the axial direction, the discharge direction is limited to the axial direction.

The present invention is proposed in view of the above-mentioned problems and has an object to provide a supplying apparatus of granular material which has a simplified structure and is capable of discharging granular material toward one side in the radial direction relative to the axial direction of a valve body.

Means of Solving the Problems

In order to achieve the above-mentioned problem, in a supplying apparatus of granular material including a storage container storing granular material and a supplying portion having a columnar valve body sliding along an opening direction of a guide hole provided for the storage container, the supplying portion supplying granular material to a supply destination; the valve body includes a material supplying passage penetrating the valve body so as to provide an inlet and an outlet on a side circumferential face and includes a closing portion closing the guide hole when the valve body is at a closed position, the closing portion being provided in the guide hole; and the material supplying passage slants in such a manner that the inlet opens in the storage container and the outlet opens outside the storage container when the valve body is at a supply position supplying granular material.

Effects of the Invention

The supplying apparatus of granular material in one aspect of the present invention as mentioned above simplifies the structure and is able to discharge granular material toward one side in the radial direction relative to the axial direction of the valve body.

BRIEF DESCRIPTION OF THE DRAWINGS

FIG. 1A and FIG. 1B diagrammatically illustrate one example of a supplying apparatus of granular material in accordance with one embodiment of the present invention.

FIG. 3A to FIG. 3D diagrammatically illustrate one example of a valve body of the supplying apparatus.

DESCRIPTION OF THE EMBODIMENTS

The embodiments of the present invention are explained referring to the attached drawings. Some detailed reference numerals which are allotted to other drawings are omitted in some drawings.

In the following embodiments, the directions such as the vertical direction are explained under a standard condition in which that the supplying apparatus of granular material of one embodiment is installed.

FIG. 1 to FIG. 6 are diagrammatic views illustrating one example of the supplying apparatus of granular material of the embodiment and one example of basic operations to be executed using the supplying apparatus.

Figure 1A:
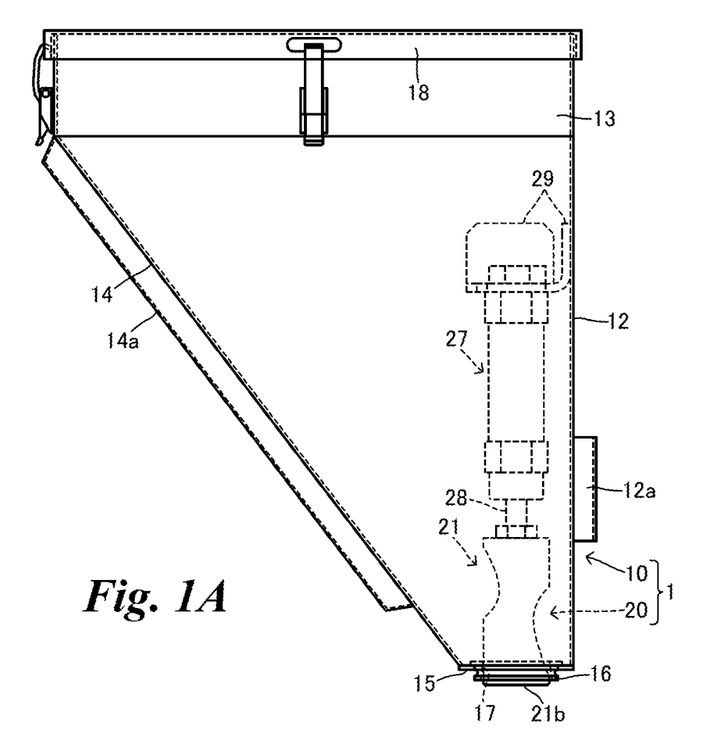
FIG. 1A is a diagrammatic side view.
Figure 4:
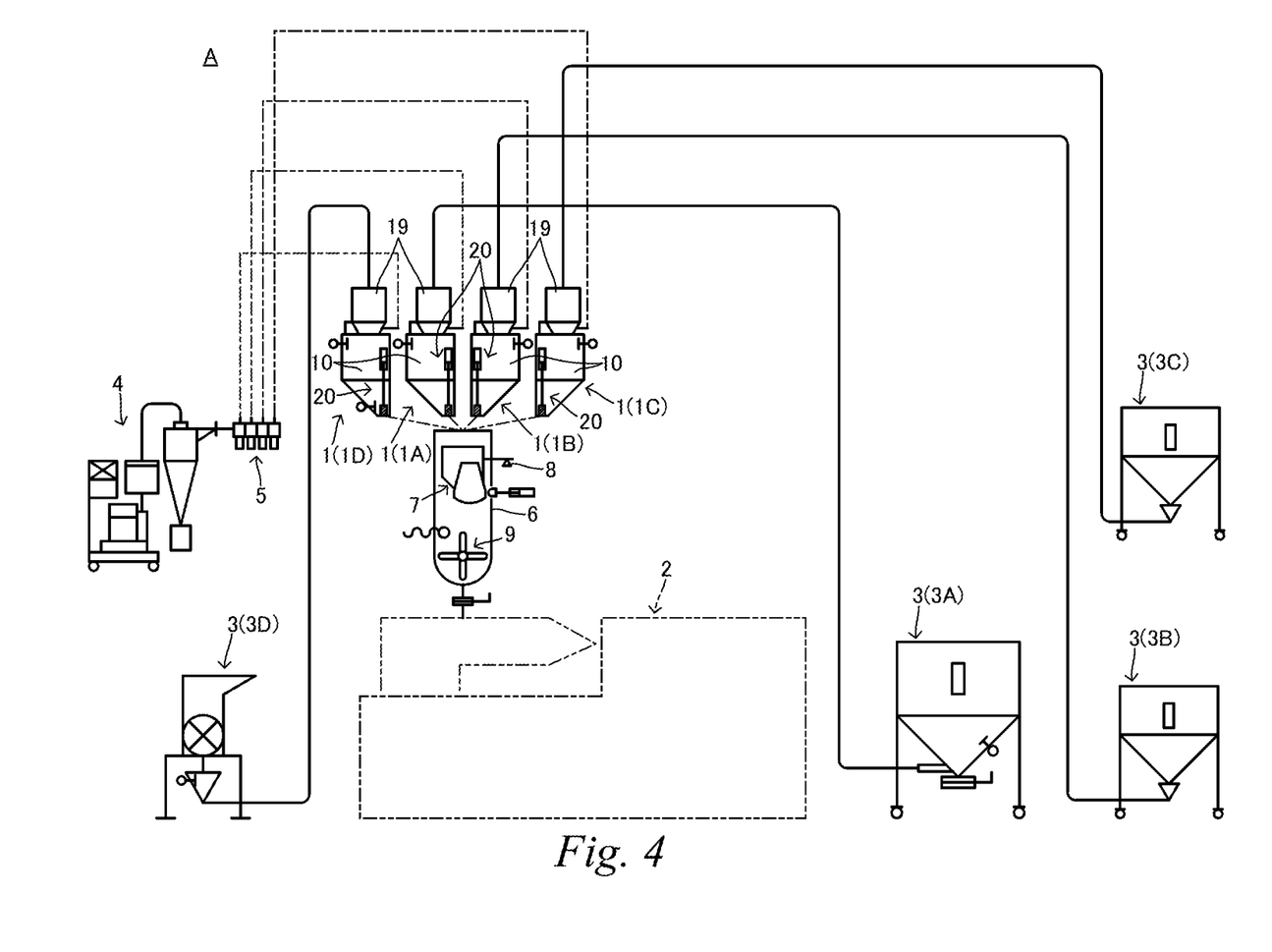
FIG. 4 illustrates a diagrammatic system of one example of a blending system to which the supplying apparatus is incorporated.

As illustrated in FIG. 1A, a supplying apparatus of granular material 1 in one embodiment has a storage container 10 storing granular material and a supplying portion 20 supplying granular material to a supply destination (a measuring container) 7, referring to FIG. 4. In this embodiment, the supplying apparatus 1 is configured so as to supply granular material to the measuring container 7, i.e., the supply destination, which is provided on the lower side so as to become a predetermined target measurement value. The supplying apparatus 1 and a measuring device including the measuring container 7 can constitute a material measuring apparatus. Specific structure of the supplying apparatus 1 is explained later.

The above-mentioned granular material refers to powdered or granular material and includes material in the form of minute flakes, short fibers, slivers, and so on.

The material includes any material such as synthetic resin material like resin pellets and resin fibers, metal material, semiconductor material, woody material, material for medicine, and food material.

Granular material, for example for molding synthetic resin products, includes natural material (virgin material), pulverized material, master batch material, additive agent, and so on. Granular material can include reinforced fibers such as glass fibers and carbon fibers.

In the embodiment, the supplying apparatus 1 is incorporated into a material blending apparatus which is provided for a blending system A blending several kinds of granular material so as to have a predetermined blend ratio, i.e., mass ratio, as illustrated in FIG. 4. The blending system A has a plurality of supplying apparatus 1 (1A, 1B, 1C, 1D) which store different kinds of granular material respectively, and the measuring container 7 receiving and measuring each kind of granular material supplied from the supplying apparatus 1. The drawings illustrate an example with four supplying apparatus 1. Four supplying apparatus 1 can include a first supplying apparatus 1A supplying main natural material, a second supplying apparatus 1B supplying master batch material, a third supplying apparatus 1C supplying an additive agent, and a fourth supplying apparatus 1D supplying pulverized material. When it is not required to distinguish the first supplying apparatus 1A, the second supplying apparatus 1B, the third supplying apparatus 1C, and the fourth supplying apparatus 1D, the supplying apparatus 1 is used in the following explanation.

The blending system A has a mixing tank including a rotatable agitating blade 9 mixing the granular material which is measured in and is discharged from the measuring container 7. The drawings illustrate an example in which the measuring container 7 and the agitating blade 9 are provided in a unitized casing 6. The casing 6 has on the top end portion a suitable holding portion holding the storage container 10 of each supplying apparatus 1.

The measuring container 7 is held by the casing 6 via a detecting section 8 consisting of a mass detector such as a load cell. The measuring container 7 has on the upper end side an inlet opening upward. The inlet of the measuring container 7 is provided so as to receive the granular material supplied from each supplying apparatus 1 on an upstream side, i.e., an upper side. The measuring container 7 has on the lower end side an outlet opening downward and an open-close mechanism opening and closing the outlet. In the drawings, a cover body is provided as the open-close mechanism which is moved upward in an oblique direction like a pendulum and opens the outlet. The open-close mechanism is not limited to such an example and can be a slide shatter which slides in the approximately horizontal direction, a flap-like valve body supported by an arm-like support portion which rotates around a rotary axis on the side of the measuring container 7, or other configurations.

The agitating blade 9 is positioned on the lower side in the measuring container 7 and is rotated by a suitable driving section. The granular material mixed in the mixing tank having the agitating blade 9 is supplied to a molding machine 2, which is the supply destination of the blending system A. In the example in the drawings, the casing 6 is provided on the molding machine 2. The molding machine 2 can be, for example, an injection molding machine for molding synthetic resin products, an injection molding machines for other materials, other molding machines such as an extrusion molding machine or a compression molding machine for other materials. The supply destination of the blending system A is not limited to a single and can be plural destinations. The granular material mixed in the mixing tank is not limited to be supplied under its own weight to the molding machine 2, which is the supply destination, and can be pneumatically transported to the supply destination from the mixing tank or the storage portion on the downstream side, i.e., lower side, of the mixing tank. In this case, in place of providing the casing 6 on the molding machine 2, the casing 6 can be supported by a suitable frame or pedestal.

The drawings illustrate an example in which the blending system A has a pneumatic transporter 4 pneumatically transporting granular material supplied from a material supply source 3 to each supplying apparatus 1. The drawings also illustrate a first material supply source 3A connected to the first supplying apparatus 1A via a material transport pipe, a second material supply source 3B connected to the second supplying apparatus 1B via a material transport pipe, a third material supply source 3C connected to the third supplying apparatus 1C via a material transport pipe, and a fourth material supply source 3D connected to the fourth supplying apparatus 1D via a material transport pipe. When it is not required to distinguish the first material supply source 3A, the second material supply source 3B, the third material supply source 3C, and the fourth material supply source 3D, the material supply source 3 is used in the following explanation.

In the drawings, the first material supply source 3A, the second material supply source 3B, and the third material supply source 3C are illustrated in the formed of a tank. The fourth material source 3D is illustrated as a pulverizer for by-products of molding such as sprue, runner and burr which are separated from a product after taking out of the molding machine 2, or material to be pulverized such as inferior molded products. The material to be pulverized can be put into a charge hopper of the pulverizer by a transport means such as a suitable extraction apparatus of by-products or a belt conveyor.

The material transport pipe connected to the material supply source 3 is connected to a hopper-like collecting portion 19 provided on the upper end portion of the storage container 10 of each supplying apparatus 1. An air suction pipe connected to the pneumatic transporter 4 is connected to the collecting portion 19. The collecting portion 19 has a separation portion separating granular material from transport air directed to the air suction pipe. Any separation portion can be used as far as it separates granular material from transport air, and can include a porous plate body in the form of a perforated metal or a net (mesh) which passes powdered dust in addition to transport air and does not pass granular material, which is raw material, or a can include baffle board in the shape of an umbrella. Other separation portions with various structures can be also used. A separation mechanism of the collecting portion 19 can be a cyclone type structure separating granular material from transport air.

The air suction pipe connected to the collecting portion 19 is connected to the pneumatic transporter 4 via a transport air changeover valve 5. The transport air changeover valve 5 is configured to be switched so as to communicate one of a plurality of air suction pipes with a suction side of the pneumatic transporter 4. The pneumatic transporter 4 has a suitable dust collecting portion such as a bag filter or a cyclone filter, and a suction blower constituting a transport air source.

Figure 5A:
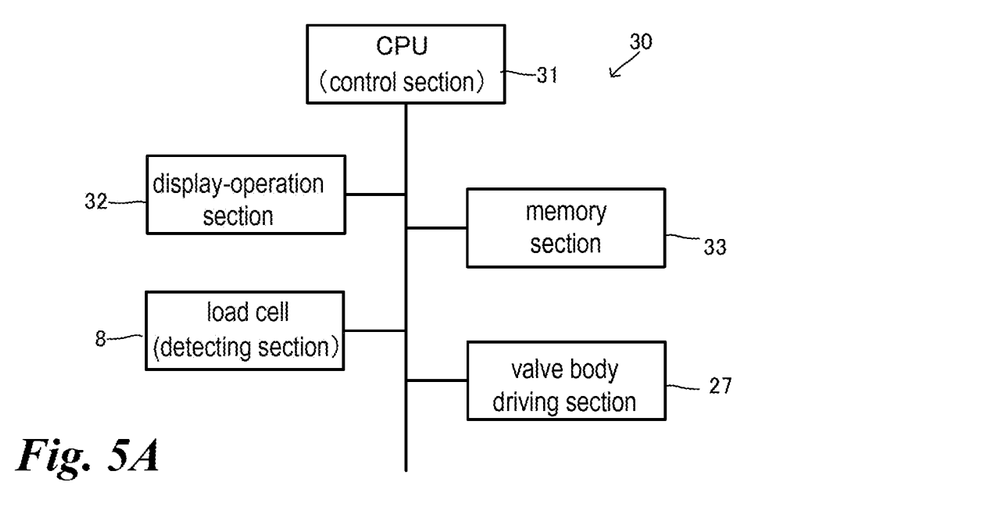
FIG. 5A is a control block diagram of the blending system.

The blending system A has a control unit 30 having a control section 31 constituted with a CPU and so on which control members of the blending system A, referring to FIG. 5A. The control unit 30 can be additionally provided for suitable portions of the blending system A, for example, the casing 6 or the pneumatic transporter 4, or can be located separately.

The control unit 30 has a display-operation section 32 constituting a display portion and an operation portion for various settings, inputting and displaying. The control unit 30 also has a memory section 33 storing set conditions and input values set and input by the display-operation section 32, programs such as control programs for executing each mode to be mentioned later, previously set operation conditions, the memory section 33 being constituted with several kinds of memories. The display-operation section 32, the memory section 33, the above-mentioned detecting section 8, and the supplying portion 20 (valve body driving section 27) of each supplying apparatus 1 are connected to the control section 31 respectively via a signal line or the like. The transport air source of the pneumatic transporter 4, the transport air changeover valve 5, the driving portion of the pulverizer constituting the fourth material supply source 3D, a material sensor provided for each supplying apparatus 1, the open-close mechanism of the measuring container 7, the driving portion of the agitating blade 9, and a material sensor provided for the mixing tank are also connected to the control section 31 respectively via a signal line or the like. The control section 31 can be connected to the material sensor and the outlet of the material supply source 3 if necessary.

The blending system A as configured above executes a transport mode for pneumatically transporting granular material to the supplying apparatus 1 from the material supply source 3, a measuring mode in the measuring container 7, and a mixing mode in the mixing tank. In the transport mode, when the material sensor of the supplying apparatus 1 outputs a material request signal, the transport air changeover valve 5 is switched so as to communicate the air suction pipe connected to the collecting portion 19 of the supplying apparatus 1 with the pneumatic transporter 4, and the transport air source of the pneumatic transporter 4 is driven. Thus, granular material is transported to the supplying apparatus 1 from the material supply source 3. In case that material request signals are output from the material sensors of a plurality (all) of the supplying apparatus 1 at the initial driving state of the blending system A, the transport mode toward each supplying apparatus 1 can be sequentially executed in accordance with a previously set priority order.

When the transport mode is executed as mentioned above and granular material is stored in each supplying apparatus 1, the measuring mode is executed.

In the measuring mode, each supplying portion 20 of the supplying apparatus 1 can be controlled in such a manner that each kind of granular material becomes a previously set target measurement value, and that one batch measuring can be executed by sequentially supplying each kind of granular material to the measuring container 7. The target measurement value of each kind of granular material can be calculated and set based on a target value of one batch and the mass ratio of each kind of granular material. Specific control embodiment of each supplying portion 20 of the supplying apparatus 1 is to be mentioned later.

When one batch measurement amount of granular material is stored in the measuring container 7 and the material sensor of the mixing tank outputs a material request signal, the outlet of the measuring container 7 can be opened to discharge granular material to the mixing tank, the agitating blade 9 can be rotated, and the mixing mode can be executed. When the measuring container 7 becomes empty, the measuring mode can be executed and one batch measurement amount of granular material can be stored in the measuring container 7 until a material request signal is output from the material sensor of the mixing tank.

After granular material is mixed in the mixing tank as mentioned above, a molding preparation procedure such as a trial operation or a test operation is duly executed in the molding machine 2 and is transferred to a stable operation procedure in which a molding procedure is successively executed. Material to be pulverized which is produced in the molding machine 2 is duly pulverized by the pulverizer constituting the fourth material supply source 3D. When a material request signal is output from the material sensor of the mixing tank in a similar manner, the outlet of the measuring container 7 is opened and the mixing mode is executed; when the measuring container 7 becomes empty, the measuring mode is executed. When a material request signal is output from each material sensor of the supplying apparatus 1, the transport mode is executed. Each mode to be executed in the blending system A is not limited to the modes mentioned above, and several variations are possible.

The embodiment in which granular material is pneumatically transported to the collecting portion 19 from the material supply source 3 is not limited to the above-mentioned suction transport; compressed air can be supplied to the outlet of the material supply source 3 and granular material can be transported under pressure to the collecting portion 19. In such a case, a discharge pipe having a suitable dust collecting portion can be connected to the collecting portion 19. The embodiment of supplying (feeding) granular material to each supplying apparatus 1 is not limited to pneumatic transport; granular material can be supplied (fed) by dropping due to the gravity from the upstream side (upper side); or granular material can be supplied by an operator.

In place of the embodiment in which each of the plurality of supplying apparatus 1 has the supplying portion 20 to be mentioned later, the supplying portion can be provided for at least one of the supplying apparatus and other supplying apparatus can have other supplying portions. Such a supplying portion includes a slide shutter, a screw feeder, a vibration feeder, a mass feeder, a rotary feeder, and a table feeder; and other structures can be used.

In the above-mentioned example, the mixing tank is provided for the casing 6; however, other mixing mechanisms can be provided in place of such an example. For example, granular material measured and blended in the measuring container 7 can be pneumatically transported and mixed in the collecting portion. Specific structure of each member and each portion which are incorporated into the blending system A is not limited to those mentioned above and various modifications are possible.

In place of the embodiment in which the material blending apparatus, i.e., blending system A, is configure by incorporating a plurality of supplying apparatus 1, the material measuring apparatus, i.e., measuring system, including a single supplying apparatus 1 can be adopted. In such a case, the mixing tank and the mixing mechanism are not required to be provided.

Figure 2A:
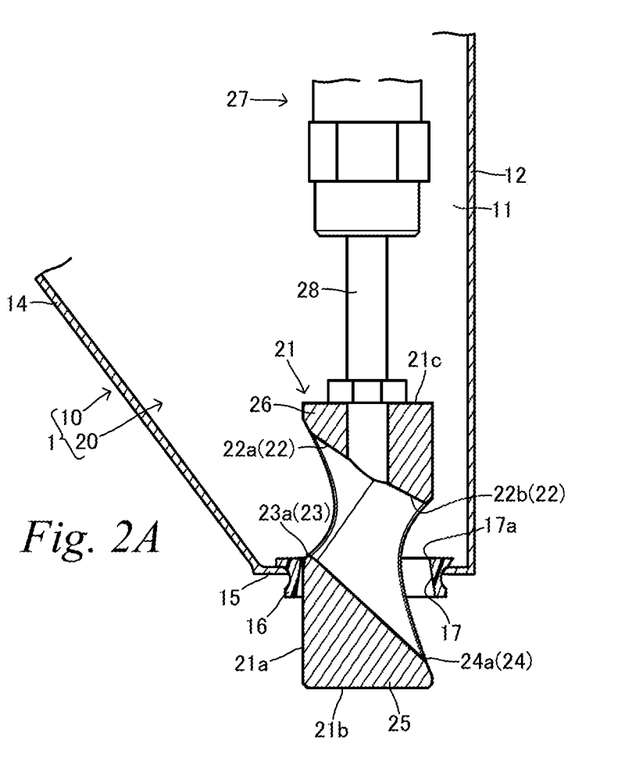
FIG. 2A and FIG. 2B are partially broken diagrammatic vertical sectional views corresponding to the line X to X in FIG. 1B.
Figure 2B:
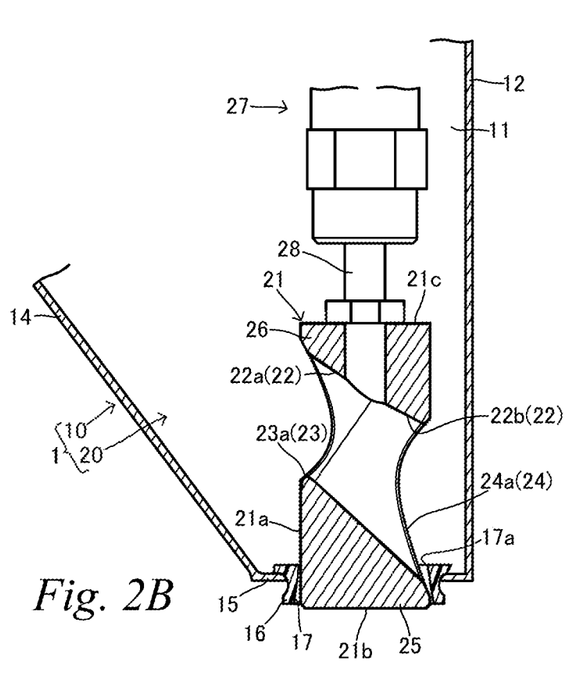

In the supplying apparatus 1, the storage container 10 has a valve body 21 which is opened when granular material is supplied as illustrated in FIG. 1A and FIG. 2. The valve body 21 is controlled by the control section 31 so as to be opened or closed and constitutes the supplying portion 20 supplying granular material to the supply destination, i.e., the measuring container 7. In this embodiment, the valve body 21 is in the shape of a column which is slid along the opening direction of a guide hole 17 provided for the storage container 10. The supplying portion 20 including the valve body 21 is detailed later.

Figure 1B:
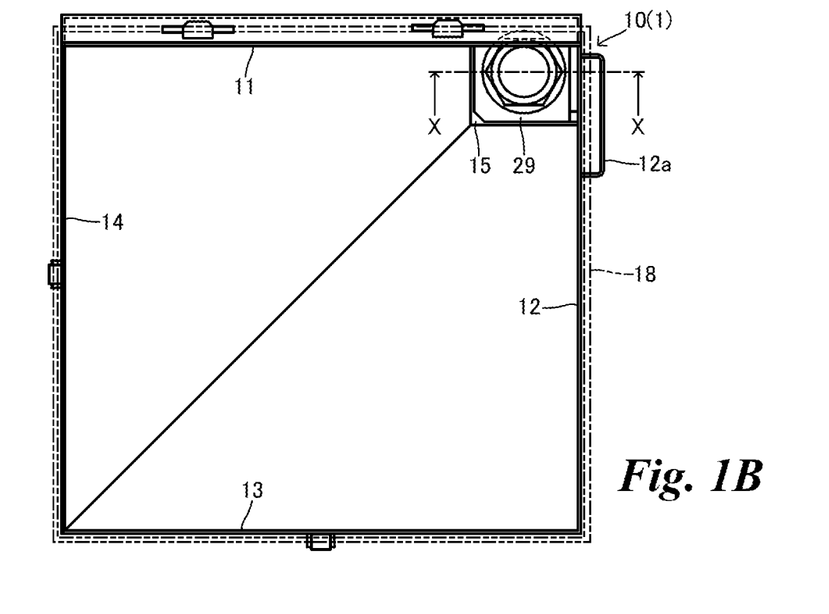
FIG. 1B is a partially omitted diagrammatic plan view.

The storage container 10 is formed like a hopper in such a manner that the upper region is tubular and the lower region is gradually tapered downward. In this embodiment the upper region of the storage container 10 is approximately in the shape of a square tube of which plan view is rectangular as illustrated in FIG. 1B. In the example in the drawings, the upper region of the storage container 10 is approximate in the shape of a square on the plan views.

As illustrated in the embodiment in FIG. 1, among circumferential wall portions defining four sides of the storage container 10, a first side wall portion 11 and a second side wall portion 12, which are adjacent each other, are in the shape of perpendicular plates roughly along the entire up and down direction. The example in the drawing illustrates that the upper end side region of the first side wall portion 11 is a slant plate slanting downward in the outward direction. In the drawing, among the circumferential wall portions defining four sides of the storage container 10, a third side wall portion 13 and a fourth side wall portion 14, which are adjacent each other, are slant plates which slant downward to a corner of the first side wall portion 11 and the second side wall portion 12 from a lower edge of the upper region being the approximately perpendicular plate.

A portion to be held 12a which is held by a holding portion of the casing 6 is provided for the second side wall portion 12, which is one of the four circumferential wall portions. In the drawings, the portion to be held 12a is configured to define a hole-like recess which penetrates in the vertical direction and into which a piece constituting the holding portion is inserted, the piece being shaped corresponding to the shape of the second side wall portion 12.

A cover body 18 is provided on the upper end side of the storage container 10 so as to open and close the opening on the upper end side. One side portion of the cover body 18 is rotatably coupled to a rotary coupling member such as a hinge at the upper end portion of the first side wall portion 11, and is rotated relative to the storage container 10 to be opened or closed. In the drawing, a fastening metal fitting is provided on the upper end portions of the third side wall portion 13 and the fourth side wall portion 14 for fastening the other side portion of the cover body 18. The cover body 18 is not limited to the above-mentioned example which is rotatably coupled to the storage container 10 and can be detachably provided. The above-mentioned collecting portion 19 can be provided for the cover body 18. In such a case, the cover body 18 can be provided with an opening which is communicated with the outlet of the collecting portion 19 or into which the discharge pipe is inserted. The reference numeral 14a in FIG. 1A indicates a window portion which is provided for the fourth side wall portion 14 and through which the inside is visible.

A bottom wall portion 15 is provided on the lower end side of the storage container 10. The guide hole 17 is provided so as to penetrate the bottom wall portion 15 in the vertical direction. In this embodiment, the guide hole 17 is configured in such a manner that the dimension along the opening direction (vertical direction) of the guide hole 17 is larger than the thickness of the bottom wall portion 15 of the storage container 10 for which the guide hole 17 is provided, and the guide hole 17 constitutes a hole of a resin tubular member (tubular member) attached to the storage container 10. In such a configuration, compared with the example in which the guide hole 17 is constituted by penetrating the wall portion (bottom wall portion) 15 itself constituting the storage container 10, the valve body 21 to be mentioned later is stably slid. The tubular member 16 is made of resin, thereby eliminating operation failures caused by biting by granular material between the circumferential edge portion of the guide hole 17 and the open circumferential edge portion of an opening, i.e., an outlet 24 to be mentioned later in this embodiment, provided for the valve body 21.

The tubular member 16 can be a molded product made from resin material with good abrasion resistance and slidability such as polyacetal (POM), and oil implemented polyacetal, or can be a so-called bushing. The thickness dimension, in the vertical direction, of the tubular material 16 can be duly determined in view of the stable sliding of the valve body 21, and downsizing the dimension in the vertical direction of the valve body 21 to be mentioned later. In the example in the drawings, the tubular member 16 is projected toward the lower side further than the lower face of the bottom wall portion 15. Also in the example, the tubular member 16 is attached to a mounting hole of the bottom wall portion 15 in such a manner that a flange portion provided on the outer circumferential edge portion on the upper end side of the tubular member 16 is engaged to the circumferential edge portion, on the inner side of the storage container 10, of the mounting hole of the bottom wall portion 15.

The shape of the guide hole 17 of the tubular member 16 when seen in the opening direction depends on the shape of the valve body 21, to be mentioned later, when seen in the axial direction. In the embodiment, the guide hole 17 is circular when seen in the opening direction. Also in the embodiment, the guide hole 17 is gradually enlarged in diameter toward the lower side, which is the outside of the storage container 10. The guide hole can be a hole provided for the bottom wall portion 15 of the storage container 10 in place of the embodiment in which the guide hole 17 is the hole of the tubular member 16 made from resin.

The supplying portion 20 has a valve body driving section 27 which moves the valve body 21 to a closed position or an open position, as illustrated in FIG. 1A and FIG. 2. In the embodiment, the valve body driving section 27 is a cylinder having a rod 28 which is elongated or contracted in the vertical direction relative to a cylinder body. The cylinder constituting the valve body drive body 27 includes an air cylinder, a hydraulic cylinder, and an electric cylinder. In the embodiment, the valve body drive body 27 is provided in the storage container 10. In addition, a bracket-like holding portion 29 holding the valve body driving section 27 is fixed to the inner wall of the storage container 10. An air supplying pipe connected to the valve body driving section 27 can be provided so as to penetrate the circumferential wall portion of the storage container 10. In this case, the connection portion of the air supplying pipe can be provided for the outer wall portion of the circumferential wall of the storage container 10.

The valve body 21 is columnar in such a manner that the axial direction is along the vertical direction. The valve body 21 has a closing portion 25 provided in the guide hole 17 when the valve body 21 is at the closed position, and a material supplying passage 22 communicating the inside of the storage container 10 and the outside of the storage container 10 when the valve body 21 is at the open position. In such a configuration, granular material is more efficiently inhibited from being bitten, compared with a flap-like valve body closing the outlet of the storage container 10 or a conic valve body closing the valve body and the outlet by being fitted thereinto. Thus, the valve body 21 is opened and closed at relatively high speed, so that the supply amount at one opening operation is effectively reduced, like the supplying mode to be mentioned later.

As illustrated in FIG. 2B, the closing portion 25 is provided in the guide hole 17 when the valve body 21 is at the closed position; and the guide hole 17 is closed. Therefore, the structure is further simplified compared with an example in which a container tube housing the valve body 21 is provided in the storage container 10 so as not to open an inlet 23 of the valve body 21 in the storage container 10 when the valve body 21 is at the closed position.

In the embodiment, the material supplying passage 22 of the valve body 21 is provided so as to penetrate the valve body 21 in such a manner that the inlet 23 and the outlet 24 open on the side circumferential face 21a of the valve body 21. As illustrated in FIG. 2A, the material supplying passage 22 is obliquely configured such that the inlet 23 opens in the storage container 10 and the outlet 24 opens outside the storage container 10 at the supply position (open position) where the valve body 21 supplies granular material. In such a configuration, the outlet 24 obliquely opens relative to the axial direction of the valve body 21 and granular material in the storage container 10 is discharged to one side of the radial direction of the valve body 21. As mentioned above, when granular material is designed to be discharged to the inlet of the measuring container 7 on the lower side from each storage containers 10 of the plurality of supplying apparatus 1, the valve body 21 of each storage container 10 is arranged so as to discharge granular material toward the central side of the measuring container 7, so that granular material is inhibited from scattering outside the measuring container 7.

In the embodiment, the valve body 21 is approximately cylindrical as illustrated in FIG. 3A to FIG. 3D. In such a configuration, compared with the example in which the valve body 21 is in the shape of a rectangular column, and the inlet 23 and the outlet 24 are provided so as to open on the side face, the open area, i.e., square measure along the circumferential direction, of the inlet 23 and the outlet 24 which open on the side circumferential face 21a is effectively enlarged. In addition, the valve body 21 is approximately the same in diameter roughly along the entire axial direction.

In the embodiment, the closing portion 25 of the valve body 21 is provided for the outer side of the storage container 10 further than the material supplying passage 22 in the axial direction of the valve body 21 in such a manner that the material supplying passage 22 is positioned in the storage container 10 when the valve body 21 is at the closed position. In such a configuration, granular material flows through the inlet 23 to the material supplying passage 22 in the storage container 10 when the valve body 21 is at the closed position, so that granular material is promptly discharged when the valve body 21 is at the open position. The closing portion 25 is provided in such a manner that the approximately entire outer circumferential face of the closing portion 25 abuts on or becomes adjacent to the inner circumferential face of the guide hole 17 when the valve body 21 is at the closed position.

Figure 3A:
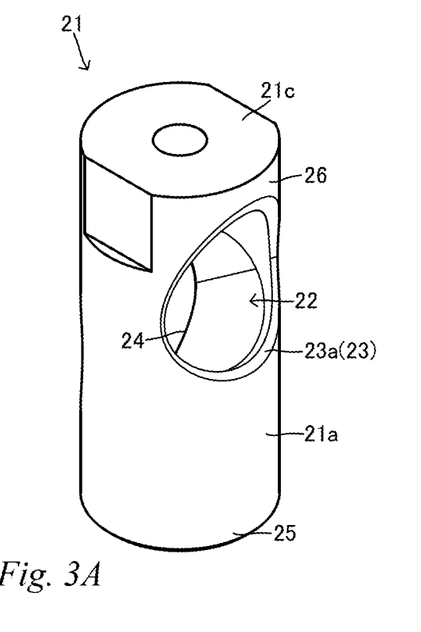
FIG. 3A is a diagrammatic perspective view.
Figure 3B:
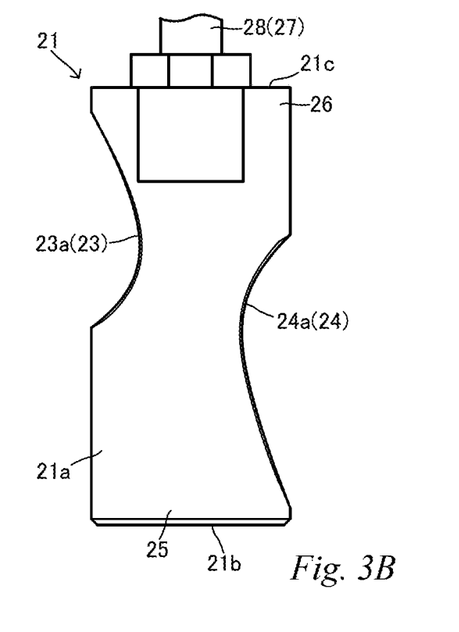
FIG. 3B is a diagrammatic side view.

In the embodiment, the rod 28 of the valve body driving section 27 is coupled to an upper end portion 26 of the valve body 21; and the closing portion 25 is constituted by the lower end portion of the valve body 21, i.e., an outer end portion of the storage container 10 in the axial direction of the valve body 21. As illustrated in FIG. 2B, the closed position of the valve body 21 is such that the rod 28 of the valve body driving section 27 in the storage container 10 is contracted; and as illustrated in FIG. 2A, the open position of the valve body 21 is such that the rod 28 is elongated. The valve body 21 can be configured such that a lower end face 21b of the valve body 21 is on the roughly same plane as the lower end face of the tubular member 16 constituting the guide hole 17 when the valve body 21 is at the closed position. In the drawings, the lower end face 21b of the valve body 21 is positioned slightly under the lower end face of the tubular member 16 when the valve body 21 is at the closed position; however, the lower end face 21b of the valve body 21 and the lower end face of the tubular member 16 can be on the same plane, or the lower end face 21b of the valve body 21 can be slightly on the upper side of the lower end face of the tubular member 16. Namely, the valve body 21 can be configured in such a manner that the closing portion 25 of the valve body 21 does not project into the lower side of the circumferential edge portion of the lower end side (outer side) of the guide hole 17, i.e., the lower end face of the tubular member 16, at the closed position. In the drawings, a C-chamfered portion is provided on the outer circumferential edge portion of the lower end face 21b. The upper end portion 26 of the valve body 21 is provided with a female screw hole to be coupled with the rod 28 so as to open on the upper end face 21c as illustrated in FIG. 3A. The outer circumferential edge portion of the upper end face 21c can be provided with a suitable chamfered portion.

The material supplying passage 22 slants relative to the axial direction of the valve body 21, i.e., the elongating or contracting direction of the rod 28, in the vertical direction. The slant angle of the material supplying passage 22 can be duly determined in view of downsizing the dimension of the valve body 21 in the axial direction and improving discharge ability of granular material; the slant angle can be, for example, about 20 to 60 degrees relative to the face perpendicular to the axial direction of the valve body 21 (the horizontal face); the slant angle is about 35 degrees in the drawings. The material supplying passage 22 is provided in an approximately linear fashion without curving or without bending in the middle thereof. In the embodiment, the material supplying passage 22 is provided in such a manner that the axial center of the material supplying passage 22 and the axial center of the valve body 21 are on the approximately same plane. In addition, the valve body 21 is positioned in such a manner that the slant direction of the material supplying passage 22 comes to be along the slant direction of the fourth side wall portion 14, i.e., one of the circumferential wall portions of the storage container 10, which slants as mentioned above. Namely, the valve body 21 is positioned in such a manner that the outlet 24 opens toward the second side wall portion 12 which is an approximately perpendicular plate of the storage container 10. In such a configuration, granular material flowing along the fourth side wall portion 14 smoothly flows along the material supplying passage 22 when the valve body 21 is at the open position.

The opening, directing obliquely upward, of the material supplying passage 22 constitutes the inlet 23 and the opening, directing obliquely downward, constitutes the outlet 24.

The inlet 23 is provided so as to open on the side circumferential face 21a on the upper end side of the valve body 21. The inlet 23 is approximately in the shape of a circle (an exact circle) seen in the penetrating direction of the material supplying passage 22. As illustrated in FIG. 2A and FIG. 2B, the inlet 23 is positioned in the storage container 10 in both cases when the valve body 21 is at the open position and at the closed position; and the lower edge of the open circumferential edge portion is positioned at roughly the same height as the circumferential edge portion 17a (inner circumferential edge portion), on the inner side of in the storage container 10, of the guide hole 17 when the valve body 21 is at the open position.

The diameter (inner diameter) of the inlet 23 can be duly determined in view of strength of the valve body 21 and of improving discharge ability of granular material; it can be around three-fifths to nine-tenths of the diameter (outer diameter) of the valve body 21; it is about four-fifths in the example in the drawings.

In the embodiment, the open circumferential edge portion of the inlet 23 has a chamfered portion 23a. In such a configuration, granular material hardly gets lodged at the open circumferential edge portion of the inlet 23, so that granular material smoothly flows into the material supplying passage 22. The chamfered portion 23a is provided entirely along the open circumferential edge portion of the inlet 23. In the drawings, the chamfered portion 23a is a C-chamfered plane, but it can be an R-chamfered plane. In place of providing the chamfered portion 23a for the entire open circumferential edge portion of the inlet 23, the chamfered portion 23a can be provided only for the region of the open circumferential portion of the inlet 23 on the side of the closing portion 25; in addition, the chamfered portion 23a is not required to be provided.

The outlet 24 is provided so as to open on the side circumferential face 21a, which is on the lower end side of the valve body 21 and is opposite to the inlet 23 in the radial direction. The outlet 24 is provided in such a manner that the lower end edge of the open circumferential edge portion is positioned on the upper side of the lower end face of the tubular member 16 when the valve body 21 is at the closed position, as illustrated in FIG. 2B. In the embodiment, the outlet 24 opens also in the storage container 10 in such a manner that a space is formed between the open circumferential edge portion (the upper end edge), of the outlet 24 on the inner side of the storage container 10 and the inner circumferential edge portion 17a of the guide hole 17 when the valve body 21 is at the open position as illustrated in FIG. 2A. Such a configuration reduces operation failures caused by biting by granular material between the inner circumferential edge portion 17a of the guide hole 17 and the open circumferential edge portion of the outlet 24 on the inner side of the storage container 10. The open area of the outlet 24 which opens in the storage container 10 when the valve body 21 is at the open position can be duly determined so as to pass granular material. In such a configuration, the outlet 24 which opens in the storage container 10 can be functioned as the inlet.

Figure 3C:
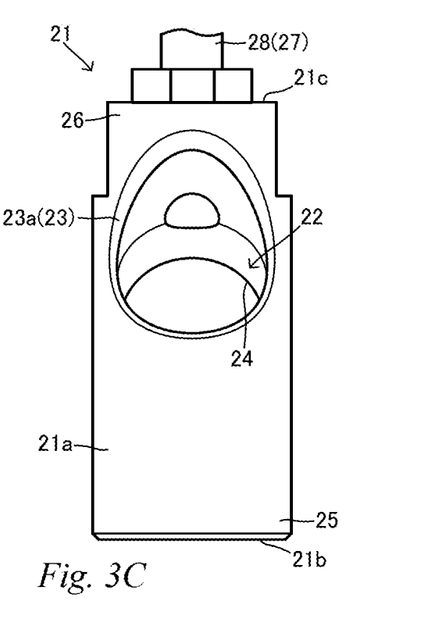
FIG. 3C is a diagrammatic front view.
Figure 3D:
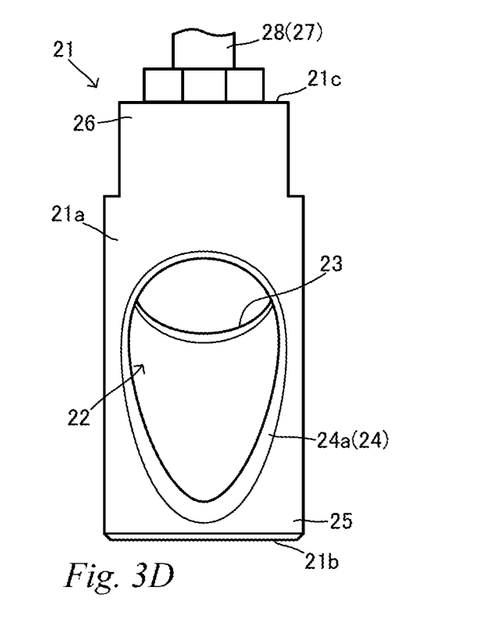
FIG. 3D is a diagrammatic back view.

In the embodiment, the diameter (the inner diameter) of the outlet 24 is larger than the diameter (the inner diameter) of the inlet 23 as illustrated in FIG. 3C and FIG. 3D. Namely, the material supplying passage 22 is gradually enlarged in diameter toward the outlet 24. When the outlet 24 opens in the storage container 10 at the open position as mentioned above, the open area of the outlet 24 opening outside the storage container 10 at the open position is apt to be reduced; however, in the above-mentioned configuration, the open area of the outlet 24 opening outside the storage container 10 at the open position is increased. When the valve body 21 is at the open position, the open area of the outlet 24 opening outside the storage container 10 can be duly determined in view of downsizing the valve body 21 and improving the discharge ability of granular material, or can be roughly the same as the open area of the inlet 23.

In the embodiment, as illustrated in FIG. 2, the inner diameter of an upper supplying passage 22a, on the side of the inlet 23, of the material supplying passage 22 is the same as that of the inlet 23; and the inner diameter of a lower supplying passage 22b, on the side of the outlet 24, of the material supplying passage 22 is gradually enlarged in diameter toward the outlet 24. Namely, the material supplying passage 22 is gradually enlarged in diameter from the middle region toward the outlet 24. In place of such a configuration, the entire material supplying passage 22 can be gradually enlarged in diameter toward the outlet 24.

In the embodiment, the outlet 24 is approximately in the shape of an ellipse which is elongated in the roughly axial direction of the valve body 21 when seen in the penetrating direction of the material supplying passage 22. Namely, the lower supplying passage 22b is gradually enlarged in diameter in the roughly axial direction toward the outlet 24. In other words, the diameters of the inlet 23 and the outlet 24 along the circumferential direction of the valve body 21 are approximately the same.

In the embodiment, a chamfered portion 24a is provided at the open circumferential edge portion of the outlet 24 at least on the side of the closing portion 25. Such a configuration reduces operation failures caused by biting by granular material between the open circumferential edge portion of the outlet 24 on the side of the closing portion 25 and the guide hole 17. In the embodiment, the chamfered portion 24a is provided entirely along the open circumferential edge portion of the outlet 24. In place of providing the chamfered portion 24a for the entire open circumferential edge portion of the outlet 24, the chamfered portion 24a can be provided only for the region of the open circumferential portion of the outlet 24 on the side of the closing portion 25; or the chamfered portion 24a is not required to be provided.

The valve body 21 and the storage container 10 can be made from suitable metal material. A grating member for preventing insertion of fingers can be provided on the upper side of the valve body driving section 27 in the storage container 10.

Figure 5B:
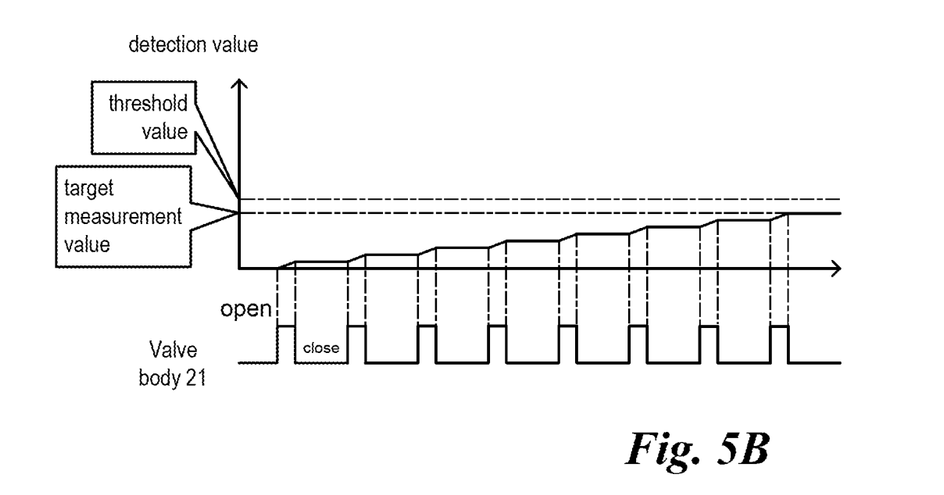
FIG. 5B is a diagrammatic time chart illustrating one example of basic operations executed in the blending system.
Figure 6A:
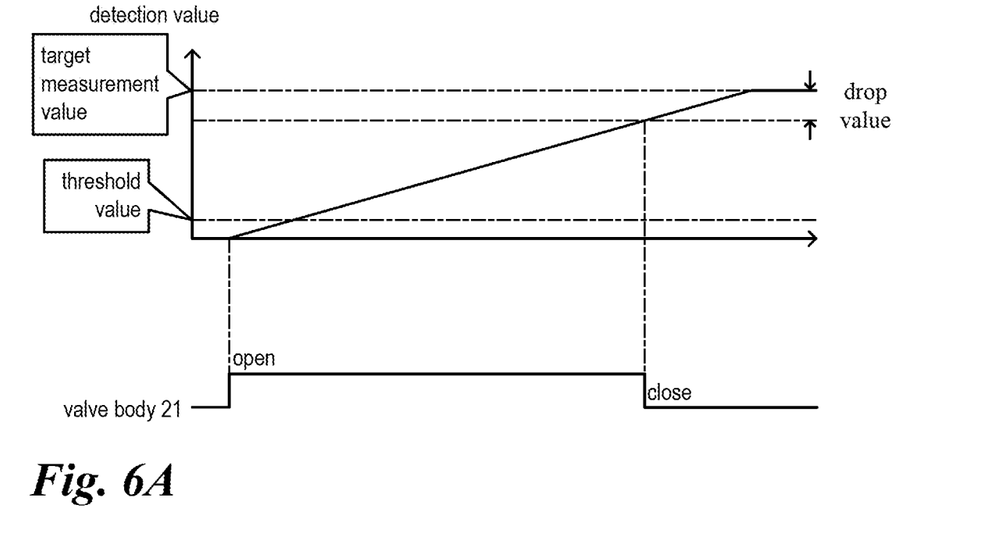
FIG. 6A and FIG. 6B are diagrammatic time charts illustrating other examples of basic operations executed in the blending system.
Figure 6B:
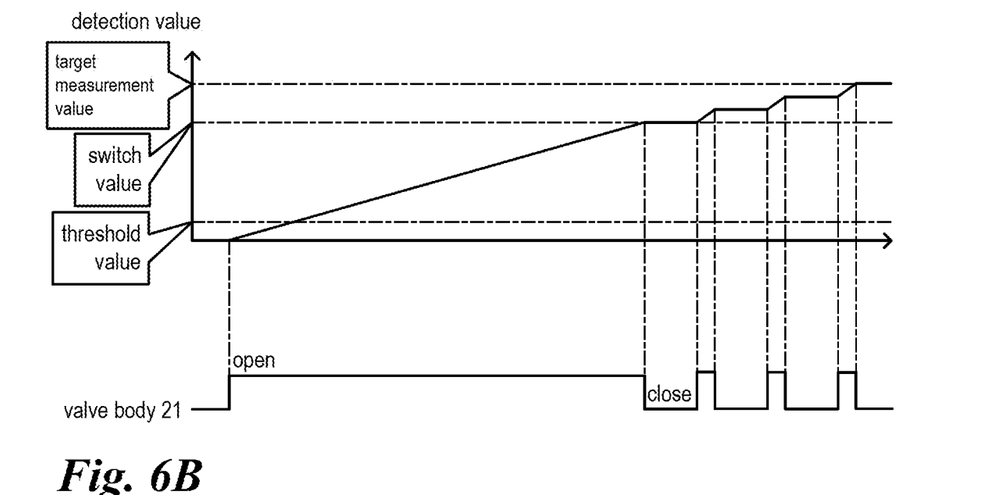

Next explained is a method of supplying granular material in one embodiment as one example of supplying mode which is executed using the supplying apparatus 1 of the embodiment, referring to FIG. 5B, FIG. 6A, and FIG. 6B. In the graphs in FIG. 5B, FIG. 6A, and FIG. 6B, the horizontal axes indicate time axes, the vertical axes indicate detection values of the above-mentioned detecting section 8 of the measuring container 7, and the transitions are diagrammatically illustrated. In FIG. 5B, FIG. 6A, and FIG. 6B, open and close operations of the valve body 21 are diagrammatically illustrated.

In the supply method, granular material is supplied by opening the valve body 21 provided for the storage container 10 to the measuring container 7 provided on the lower side in such a manner that granular material becomes a predetermined target measurement value. In the supply method, when the target measurement value exceeds a predetermined threshold value, the valve body 21 is kept at the open position until the detection value of the detecting section 8 in the measuring container 7 becomes a predetermined value smaller than the target measurement value; when the target measurement value is under the above-mentioned threshold value, the valve body 21 is opened in a pulsed way in such a manner that the detection value of the detecting section 8 becomes the target measurement value. The supply method is executed under the control of the above-mentioned control section 31. Namely, when the target measurement value exceeds the above-mentioned threshold value, the control section 31 keeps the valve body 21 at the open position until the detection value of the detecting section 8 of the measuring container 7 becomes a predetermined value smaller than the target measurement value; when the target measurement value is under the above-mentioned threshold value, the control section 31 opens the valve body 21 in a pulsed way in such a manner that the detection value of the detecting section 8 becomes the target measurement value.

In the above-mentioned configuration, when the target measurement value is relatively large, the valve body 21 is kept at the open position until the detection value of the detecting section 8 becomes a predetermined value; compared with the example in which open and close operations of the valve body 21 are repeated, the supplying duration, i.e., the measuring duration, is reduced. When the target measurement value is relatively small, the valve body 21 is opened in a pulsed way in such a manner that the detection value of the detecting section 8 becomes the target measurement value, so that the supply amount per an open operation is remarkably reduced and the measuring accuracy is improved.

When plural kinds of granular material are blended in the measuring container 7, the target measurement value can be calculated and set based on the mass ratio and one-batch target amount input by the display-operation section 32 or input by the display-operation section 32. The above-mentioned threshold value can be a suitable value in view of improving the measuring accuracy or in view of reducing the measuring duration, or can be varied depending on the kinds of granular material. The threshold value can be a value when the number of opening of the valve body 21 opened in a pulsed way to be mentioned later is equal to or less than 50; the number is preferably equal to or less than 20. The threshold value can be almost the same as a drop value to be mentioned later.

As illustrated in FIG. 5B, when the target measurement value is under the above-mentioned threshold value, the control section 31 opens the valve body 21 in a pulsed way; namely a small amount supplying mode in which the valve body 21 quickly repeats open and close operations is executed. One-time open duration, i.e., the pulse width, of the valve body 21 in the small amount supplying mode can be relatively short in view of improving the measuring accuracy; for example, it can be equal to or less than one second, preferably equal to or less than 0.5 seconds, or more preferably equal to or less than 0.2 seconds. One-time open duration of the valve body 21 in the small amount supplying mode can be set in such a manner that the supply amount in one-time open duration is equal to or less than 1 gram. The closed duration between the pulses of the valve body 21 in the small amount supplying mode can be almost the same as that in the one-time open duration; however, it is larger than the one-time open duration in the drawings. When open and close operations are quickly repeated and the small amount supplying mode is executed, the detection value of the detecting section 8 stepwisely increases; when it becomes the target measurement value, the vale body 21 is closed, and the small amount supplying mode is finished.

As illustrated in FIG. 6A, when the target measurement value exceeds the above-mentioned threshold value, the control section 31 executes a large amount supplying mode in which the valve body 21 is kept at the open position until the measurement value becomes a predetermined value. In FIG. 6A and FIG. 6B, the threshold value is illustrated to be lower than that in FIG. 5B; however, they are actually the same. In FIG. 6A, the above-mentioned predetermined value is set as a previously set drop value, i.e., mass of granular material dropping after the valve body 21 is closed. In the example, in case that the target measurement value exceeds the above-mentioned threshold value, the control section 31 closes the valve body 21 when the detection value of the detecting section 8 becomes a value obtained by subtracting the previously set drop value from the target measurement value. Namely, in the large amount supplying mode in the embodiment, the control section 31 keeps the valve body 21 at the open position until the detection value of the detecting section 8 becomes a value obtained by subtracting the drop value from the target measurement value. In such a configuration, in addition to reducing the measuring duration, granular material is properly supplied considering the drop value after the valve body 21 is closed, and the measuring accuracy is improved.

The above-mentioned drop value can be stored in the memory section 33 in advance as an initial data, can be selected from several values depending on the particle diameter or the bulk density of granular material, or can be input and set and input by the display-operation section 32. The drop value can be corrected based on the actual measurement data as needed and the data in the memory section 33 can be updated each time the large mount supplying mode is executed. In such a case, the drop value can be corrected or updated based on the average movement value of one batch measurement in the previous times.

In place of the above, a large amount supplying mode in a modified embodiment illustrated in FIG. 6B can be executed. In the modification, in case that the target measurement value exceeds the above-mentioned threshold value, when the detection value of the detecting section 8 becomes a predetermined value (switch value), the control section 31 opens the valve body 21 in a pulsed way in such a manner that the detection value of the detecting section 8 becomes the target measurement value. Namely, in the large amount supplying mode in the modification, the control section 31 keeps the valve body 21 at the open position until the detection value of the detecting section 8 becomes the switch value; when the detection value becomes the switch value, the control section 31 opens the valve body 21 in a pulsed way. In such a configuration, in addition to reducing the measuring duration, after the detection value becomes the switch value, the valve body 21 is opened in a pulsed way, and the supply amount per an open operation is reduced and the measuring accuracy is improved.

The above-mentioned switch value can be stored in the memory section 33 in advance as an initial data or can be selected from plural values depending on the particle diameter or the bulk density of granular material. The switch value can be approximately the same as the drop value.

The embodiment in which the valve body 21 is opened in a pulsed way after the detection value becomes the switch value can be the same as that in the above-mentioned small amount supplying mode.

The large amount supplying mode in the modification, i.e., the second large amount supplying mode, and the large amount supplying mode explained referring to FIG. 6A, i.e., the first large amount supplying mode, can be selectively executed. In this case, the mode selection can be executed by the display-operation section 32.

The supply method of granular material of the embodiment as one example of the supplying mode which is executed using the supplying apparatus 1 of the embodiment is not limited to the above and other variations are possible. The supply method is not limited to the configuration using the supplying apparatus 1 of the embodiment and can be executed using other supplying apparatus of various configurations.

In the above examples, the storage container 10 is approximate in the shape of a square on the plan view, but it can be in the shape of other polygons or of approximate circles.

In addition, in the above examples, the valve body 21 of the supplying portion 20 is approximately cylindrical, but it can be an approximately polygonal column.

In the above examples, the closing portion 25 of the valve body 21 is provided for the outer side of the storage container 10 further than the material supplying passage 22 in the axial direction of the valve body 21; however, it can be provided for the inner side of the storage container 10 further than the material supply passage 22 in the axial direction of the valve body 21. Namely, the material supplying passage 22 can be provided outside the storage container 10 at the closed position of the valve body 21.

In the above examples, the material supplying passage 22 is approximately circular seen in the penetrating direction; however, it can be approximately a square or other polygonal shapes.

In the above examples, the material supplying passage 22 is gradually enlarged in diameter toward the outlet 24; however, the entire material supplying passage 22 can be approximately the same in diameter along the axial direction of the material supplying passage 22.

In the above examples, the outlet 24 also opens in the storage container 10 when the valve body 21 is at the open position; in place of such an example, the outlet 24 is not required to open in the storage container 10 when the valve body 21 is at the open position.

In the above examples, the valve body 21 moves in the vertical direction to be opened or closed; however, the valve body 21 can move in the horizontal direction or in the oblique direction to be opened or closed.

In the above examples, the valve body driving section 27 is provided in the storage container 10; however, the valve body driving section 27 can be provided outside the storage container 10. In such a case, the rod 28 of the valve body driving section 27 can be coupled to the outer end, i.e., the lower end, in the axial direction of the valve body 21.

In the above examples, the supply destination of the supplying apparatus 1 of the embodiment is the measuring container 7; however, the destination is not limited and other supply destinations can be used. The specific configurations of the members and parts of the supplying apparatus 1 of the embodiment are not limited to those mentioned above and various modifications are possible.

REFERENCE SIGNS LIST 1 supplying apparatus of granular material
10 storage container
15 bottom wall portion (wall portion of a storage container provided with a guide hole)
16 tubular member (tubular member made from resin)
17 guide hole
17a inner circumferential edge portion (circumferential edge portion on the inner side of the storage container)
20 supplying portion
21 valve body
21a side circumferential face
22 material supplying passage
23 inlet
24 outlet
24a chamfered portion
25 closing portion
7 measuring container (supply destination)

The invention claimed is:

1. A supplying apparatus of granular material, comprising a storage container storing the granular material, and a supplying portion having a columnar valve body sliding along an opening direction of a guide hole provided for the storage container, the supplying portion supplying the granular material to a supply destination;
    wherein the valve body comprises a material supplying passage penetrating the valve body so as to provide an inlet and an outlet on a side circumferential face and comprises a closing portion closing the guide hole when the valve body is at a closed position, the closing portion being provided in the guide hole,
    wherein the material supplying passage slants in such a manner that the inlet opens in the storage container and the outlet opens outside the storage container when the valve body is at a supply position supplying the granular material, and
    wherein the material supplying passage of the valve body is gradually increased in diameter toward the outlet.

2. The supplying apparatus of granular material as set forth in claim 1, wherein the valve body is approximately cylindrical.

3. The supplying apparatus of granular material as set forth in claim 1, wherein the closing portion of the valve body is provided for the material supplying passage on the outer side of the storage container in an axial direction of the valve body in such a manner that the material supplying passage is positioned in the storage container when the valve body is at the closed position.

4. The supplying apparatus of granular material as set forth in claim 1, wherein the outlet of the valve body opens also on the inner side of the storage container in such a manner that a space is formed between an open circumferential edge portion of the outlet on the inner side of the storage container and a circumferential edge portion of the guide hole on the inner side of the storage container when the valve body is at the supply position.

5. The supplying apparatus of granular material as set forth in claim 4, wherein at least the open circumferential edge portion of the outlet on a side of the closing portion has a chamfered portion.

6. The supplying apparatus of granular material as set forth in claim 1, wherein a dimension of the guide hole along the opening direction of the guide hole is larger than a thickness of a wall portion of the storage container for which the guide hole is provided and the guide hole is a hole of a tubular member made from resin attached to the storage container.

* * * * *